United States Patent [19]

Sacks

[11] 4,192,964
[45] Mar. 11, 1980

[54] MODIFIABLE STOP ELEMENT FOR CABLE CONNECTOR ASSEMBLIES

[75] Inventor: Norman M. Sacks, Westport, Conn.

[73] Assignee: Burndy Corporation, Norwalk, Conn.

[21] Appl. No.: 905,079

[22] Filed: May 11, 1978

[51] Int. Cl.² .......................................... H02G 15/08
[52] U.S. Cl. ............................... 174/73 R; 174/88 R
[58] Field of Search ............ 174/73 R, 73 SC, 88 R, 174/112; 339/276 R, 59 R, 60 R, 61 R

[56] References Cited

U.S. PATENT DOCUMENTS

| | | | |
|---|---|---|---|
| 1,443,357 | 1/1923 | Gardner | 174/112 X |
| 3,485,935 | 12/1969 | Kreuger | 174/88 R |
| 3,691,291 | 9/1972 | Taj | 174/88 R X |
| 3,748,371 | 7/1973 | Krook et al. | 174/112 X |
| 3,826,860 | 7/1974 | DeSio et al. | 174/73 SC |
| 3,992,567 | 11/1976 | Malia | 174/73 R |
| 4,006,288 | 2/1977 | Stevens | 174/73 R |
| 4,104,479 | 8/1978 | Bahder et al. | 174/73 R |

FOREIGN PATENT DOCUMENTS 60399 1/1939 Norway .................................. 174/112

*Primary Examiner*—Bruce A. Reynolds
*Assistant Examiner*—E. F. Borchelt
*Attorney, Agent, or Firm*—Howard S. Reiter

[57] ABSTRACT

This invention relates to high voltage electrical connector devices, and in one embodiment, wherein insulated cable means are to be interconnected by a compression connector, with associated bushing adaptors at the cable ends forming seats for the ends of an overall primary splice housing having an interior conductive insert, include a conductor bushing stop positioned between the compression connector and the end of the bushing adaptor on the cable from which the housing is slid into position, to keep the associated bushing adaptor from being moved as the housing is being drawn into final position and to effect conductive continuity between the conductor and the housing conductive insert.

10 Claims, 3 Drawing Figures

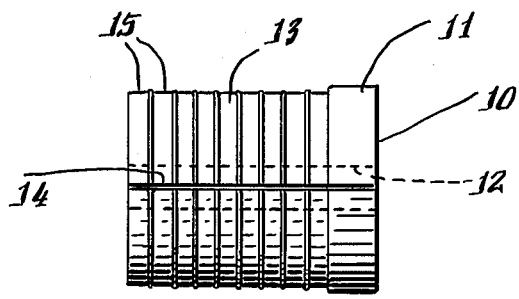
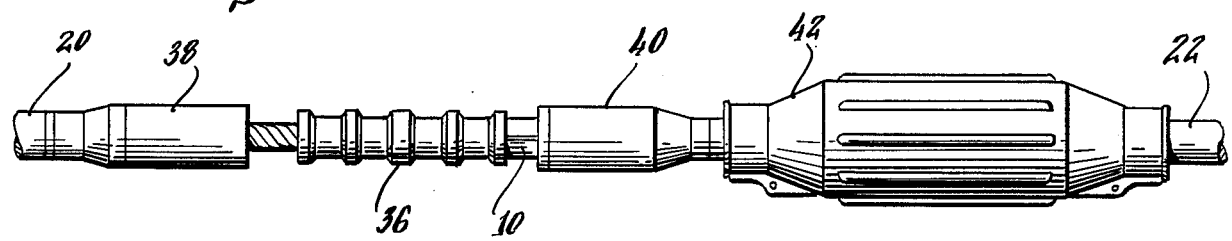
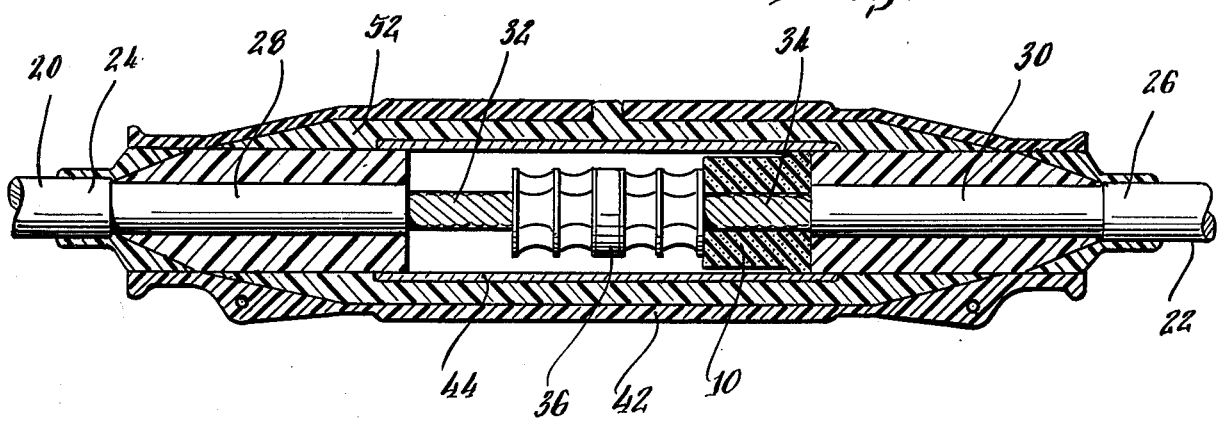

4,192,964

MODIFIABLE STOP ELEMENT FOR CABLE CONNECTOR ASSEMBLIES

BACKGROUND OF THE INVENTION

In making connection between cable ends in high voltage applications, the use of compression connectors to join the cable conductors is known, as is the building of an assembly bridging the connection from one cable end to the other to protect the connection and to render it safe to personnel. Such an assembly may consist of bushing adaptors, which may be elastomeric sleeves to be fitted on each cable end and a primary splice housing to effect the overall connection cover. Thus, in making the assembly, the conductor ends of the cables are bared of insulation and the primary housing is temporarily positioned on one of the cables. Bushing adaptors are then positioned about the insulation on each of the cable ends, the bared conductor ends are abutted inside a compression connector, and the connector is compressed. Finally, the housing is slid over the adaptor on the end of the cable about which the housing was placed until the housing covers both cable ends, where it is held in place by interference fit between the housing and the outside of the cable jacket.

As a practical matter, it is virtually impossible to install the compression connector flush with the ends of the cable insulation. Further, it is desirable for the outside diameter of the compression connector not to exceed that of the cable insulation. Additionally it is desirable, in order to distribute electrical stresses, to cause a conductive sleeve enshrouding the cable connector to be at the same electrical potential as is the cable conductor, since the interface between the conductive portions of the structure and the interior of the insulation within the housing may thereby be rendered smooth and uniform, and therefore not intolerably stressed electrically.

Various means have been proposed to accommodate one or more of these considerations. For example, some cable splicing systems utilize cable connectors having threaded ends and associated threaded connector rings, which, after installation, can be unscrewed so as to abut the associated cable insulation ends. Such threaded structures, however, are comparatively expensive to produce, and are susceptible to "walking" out of their desired position.

Another approach utilizes an aluminum holding collar to prevent linear movement of the associated adaptor, having radially oriented set screws to bind the collar to the cable conductor ends. Unification of electrical potential is achieved through use of fingered metallic springs, taped to the outside of the connector to effect electrical interconnection with the inner sleeve of the housing. Such structures are comparatively complex and expensive to produce and install.

Other splices utilize similar set-screw mounted, metallic holding collars with an associated rubber collar inserted over the outside of the connector to effect connection between the connector and the housing sleeve. The disadvantage of such holding collars have previously been noted. A rubber collar of this type has the further disadvantage of being susceptible to being moved as the outer housing is slid into place if there is sufficient frictional contact with the sleeve to ensure that a good electrical connection results.

It should be noted in particular that these prior art devices represent various attempts to accommodate more than one conductor size and/or more than one connector size, but that in each of these attempts, the solution involves structures which are relatively complex, expensive to produce and install, and of limited effectiveness.

Accordingly, it is an object of the present invention to provide a cable splice means for inhibiting migration of the associated cable adaptor as the connector housing is slid into position.

Another object of this invention is to provide such means as will also effect electrical interconnection between the cable insulation and an inner conductive sleeve of an associated housing.

Still another object of this invention is to provide means for achieving the foregoing objectives which will be comparatively structurally easy and inexpensive to produce and install.

Yet another object of this invention is to provide means for achieving the foregoing objectives which will be adaptable for use with a wide range of conductor and/or connector sizes.

SUMMARY OF THE INVENTION

Desired objectives may be achieved through practice of the present invention which, in one embodiment, wherein insulated cable ends are to be interconnected by a compression connector with associated bushing adaptors at the cable ends forming seats for the ends of an overall primary splice housing that has an interior conductive insert, includes a conductive bushing stop positioned between the end of the bushing adaptor located on the cable end from which the housing is to be slid into position and its associated compression connector, to keep that bushing adaptor from being moved as the housing is drawn into final position and to effect conductive continuity between the conductor and the housing conductive insert. Other embodiments include such bushing stops positioned on both sides of the connector to preclude undesirable dislocation of the other bushing adaptor in the event the housing is moved too far in the first direction, or for other reasons has to be moved counterdirectionally into final position.

DESCRIPTION OF DRAWINGS

This invention may be understood from the description which follows and from the attached drawings in which:

FIG. 1 depicts an embodiment of this invention,

FIG. 2 depicts the embodiment of this invention shown in FIG. 1 in use, and

FIG. 3 depicts a further step in the utilization of the embodiment of this invention shown in FIG. 1.

DESCRIPTION OF PREFERRED EMBODIMENTS

Referring first to FIG. 1, there is depicted a bushing stop 10 which embodies the present invention. As such, it is substantially cylindrical in shape, with a cylindrical conductor hole 12 through the center, and a longitudinal slit 14 extending entirely through the wall of the housing, to enable it to be opened up and placed over the conductor to which it is to be affixed as hereinafter described. The outermost portion of the slit 14 may be v-shaped in cross-section, to facilitate the stop being installed over a conductor, although such a slit is optional, and embodiments of this invention will operate without it, it is desirable for reasons which will be apparent from this description. Preferably, the bushing has an end portion 11 which is larger in diameter than the main body portion 13. The purpose of the end portion 11 being so enlarged is to effect electrical continuity between a conductor positioned within the conductor hole 12 and the interior of the housing conductive sleeve as hereinafter described. It should also be noted that the stop bushing 10 may have concentric markings 15 to facilitate measuring the length of the stop bushing to that desired for insertion and cutting it off so as to fill completely the void space between one end of the cable compression connector and the end of the bushing adaptor towards which it faces, all as hereinafter described. Preferably the bushing is made from any suitable material that is at least somewhat resilient and capable of being bent and otherwise manipulated without damage, and also is or can be made electrically conductive to a sufficient degree to enable it to perform the stress unification function herein described as by having it made from carbon-filled or other semi-conductive rubber or other elastomeric materials. Ethylene propylene diene, a plastic monomer, has also been found suitable for the applications herein described. It is also possible to use an insulating material in combination with a conductive path, such as a metal end-washer, an interior-to-exterior metallic band, or other such means.

FIGS. 2 and 3 illustrate the foregoing embodiment of this invention in use. As shown, cable ends 20, 22 have had their outer protective jackets 24, 26 removed so as to expose a length of underlying insulation 28, 30, and the terminal ends have had their insulation removed to expose the ends of their conductors 32, 34. The two conductors have been positioned substantially end-to-end, inside a compression connector 36 which has been compressed to effect a connection between the conductors. Typically the conductors 32, 34 may be made from aluminum or copper, and the compression connector 36 from tin plated copper or aluminum. Prior to making the connection of the cable ends, a bushing adaptor 38 was placed over the insulation 28 of the cable end 20, and a bushing adaptor 40 was similarly positioned over the insulation 30 of the cable end 22. These adaptors, as is known, serve the purpose of providing an insulation layer and a seal between the cable ends and the primary splice housing 42. The primary splice housing 42 is typically cylindrical in shape in the central region and larger in diameter than the compression connector and the cable ends, so as to provide a sufficient amount of room to accommodate the insulation material 52 positioned therein. The housing 42 has conical end sections to provide a transition from the larger diameter cylindrical portion to the outside of the jackets of the associated cable ends.

As finally structured, the desired configuration of a completed connection is shown in FIG. 3. The various elements heretofore described will be readily identified and it will be seen that after installation of a bushing stop 10 which embodies the present invention over the conductor 34, a conductive insert 44 made, for example, from metal or conductive rubber which has been incorporated into the housing, extends over the gap between the ends of the cable insulation layer 28, 30 in contact with the bushing adaptors 38, 40, when the splice housing 42 has been slid into position, bridging between the cable ends 20, 22.

It will be apparent from the foregoing description that as the housing 42 is slid into position bridging the two cable ends, it is probable that the bushing adaptor 40 will be dislodged from its desired position unless it is prevented from doing so by some means. Preventing such dislocation of the bushing adaptor is one of the purposes of the bushing stop which embodies the present invention. Having been prepared so as to be as long as the length of the gap between the end of the compression connector 36 facing the cable end 22 and the end of the bushing adaptor 40 facing the compression connector when the adaptor 40 is in its desired final location, the bushing stop 10 may then be opened up along its slit line 14 and installed over the conductor 34. In this posture, as will be clear from FIG. 3 in particular, the bushing stop 10 prohibits the adaptor 40 from moving out of position, closer to the connector 36, no matter how tight the fit of the insulation 52 within the housing 42 to the adaptor 40. From the same FIG. 3 it will also be apparent that the bushing stop 10 forms a conductive path between the conductor 34 and the conductive insert 44, thereby minimizing the electrical potential between the connector 36 and the conductors 32, 34 on the one hand, and the insert 44 which surrounds them on the other hand, to avoid ionization and electrical stress concentrations which are potential sources of damaging effects on the structure when it is energized at full operating voltages.

It is to be understood that the foregoing description and the embodiments described herein are by way of illustration and not of limitation and that persons ordinarily skilled in the cognizant arts may make other embodiments without departing materially from the spirit or scope of this invention.

I claim:

1. A splice connector assembly for electrically coupling the conductors of a pair of cables, said connector assembly comprising:

(a) a connector for coupling the exposed ends of the conductors of said cables;

(b) an outer sleeve, having an inner conductive surface, for surrounding said connector and the ends of said cables coupled thereby;

(c) bushings, each of which have a central opening for receiving therethrough one of said cables at a position spaced from said connector, for creating a seal between said cables and said outer sleeve when said connector assembly is assembled to said cables; and, (d) a bushing stop sleeve of resilient material, having a central opening of sufficient diameter for receiving and resiliently engaging the outer surface of the exposed end of the conductor of at least one of said cables, said bushing stop sleeve abutting at one end thereof said connector and at the other end thereof the end of a bushing facing said connector in order to maintain the spacing of said bushing from said connector, said bushing stop sleeve further having at least one outer portion, the dimension of which is such as to engage the inner conductive surface of said outer sleeve when said connector is assembled to said cables, and having at least a conductive portion for establishing a conductive path between said conductor and the inner conductive surface of said outer sleeve, the material of said bushing stop sleeve being subject to cutting with any suitable sharp instrument to reduce the axial length thereof for fitting and maintaining a desired axial spacing between said connector and the end of said bushing facing said connector.

2. A splice connector assembly as described in claim 1 wherein the conductive portion of said bushing stop sleeve comprises conductive material extending from said central opening to said outer portion for establishing a conductive path between said conductor and the inner conductive surface of said outer sleeve.

3. A splice connector assembly as described in claim 1 wherein said bushing stop sleeve is formed of conductive, elastomeric material.

4. A splice connector assembly as described in claim 1 wherein said bushing stop sleeve includes a radial slit extending longitudinally from one end thereof to the other, said slit being temporarily enlargeable through deflection of said material to permit insertion of a cable conductor into said central opening transversely through said slit.

5. A splice connector assembly as described in claim 4 wherein said bushing stop sleeve comprises conductive, elastomeric material.

6. A splice connector assembly as described in claim 1 wherein said bushing stop sleeve includes peripheral markings on the outer surface thereof, defining a plurality of parallel, axially spaced apart outer rings lying in planes substantially perpendicular to the axis of said sleeve, for aiding visual alignment of cutting tools used to reduce the axial length of said bushing stop sleeve.

7. A splice connector assembly as described in claim 6 wherein said peripheral markings comprise a plurality of external raised ribs formed on the outer surface of said bushing stop sleeve.

8. A splice connector assembly as described in claim 1 wherein said bushing stop sleeve has a first axial portion of outer diameter less than the inner diameter of the inner conductive surface of said outer sleeve, and a second axial portion of such diameter as to engage the inner conductive surface of said outer sleeve.

9. A splice connector assembly as described in claim 8 wherein said second axial portion of said bushing stop sleeve comprises a radial projection thereon extending beyond the outer diameter of said first axial portion over at least part of the periphery thereof.

10. A splice connector assembly for electrically coupling the conductors of a pair of cables, said connector assembly comprising:
   (a) a connector for axially coupling the exposed ends of the conductors of said cables;
   (b) an outer sleeve, having an inner conductive surface, for surrounding said connector and the ends of said cables coupled thereby;
   (c) a pair of bushings, each of which have a central opening for receiving therethrough one of said cables at a position spaced from said connectors, for creating a seal between said cables and said outer sleeve when said connector assembly is assembled to said cables; and,
   (d) a bushing stop sleeve formed of electrically conductive elastomeric material, having a central opening of sufficient diameter for receiving and resiliently engaging the outer surface of the exposed end of the conductor of at least one of said cables, said bushing stop sleeve abutting at one end thereof said connector and at the other end thereof the end of a bushing facing said connector in order to maintain the spacing of said bushing from said connector, said bushing stop sleeve further having at least one outer portion, the dimension of which is such as to engage the inner conductive surface of said outer sleeve, so that said bushing stop sleeve establishes a conductive path from said conductor to said inner surface of said outer sleeve when said connector assembly is assembled to said cables, said bushing stop sleeve further having a radial slit extending longitudinally from one end thereof to the other, said slit being temporarily enlargeable through deflection of said material to permit insertion of a cable conductor into said opening transversely through said slit, the material of said bushing stop sleeve being subject to cutting with any suitable sharp instrument to reduce the axial length thereof, for fitting and maintaining a desired axial spacing between said connector and the end of said bushing facing said connector.

* * * * *